United States Patent [19]

Siegler

[11] Patent Number: 5,395,514
[45] Date of Patent: Mar. 7, 1995

[54] ULTRAFILTRATION SYSTEM AND ASSEMBLY

[75] Inventor: Thomas W. Siegler, Amherst, N.Y.

[73] Assignee: Infinitex Corporation, Clarence, N.Y.

[21] Appl. No.: 61,076

[22] Filed: May 14, 1993

[51] Int. Cl.⁶ .................. B01D 61/20; B01D 61/22
[52] U.S. Cl. .................. 210/85; 184/6.24; 210/149; 210/195.2; 210/321.66; 210/416.5; 417/89; 417/201
[58] Field of Search .............. 210/85, 90, 94, 134, 210/168, 171, 194, 195.1, 195.2, 241, 257.2, 258, 321.65, 321.76, 321.85, 416.5, 651, 805, 184, 149, 799, 416.1, 321.66; 184/6.11, 6.14, 6.24; 417/89, 201

[56] References Cited

U.S. PATENT DOCUMENTS

| 3,489,245 | 1/1970 | Broadwell | 210/241 |
|---|---|---|---|
| 4,381,175 | 4/1983 | Erickson | 417/89 |
| 4,426,293 | 1/1984 | Mason et al. | 210/636 |
| 4,444,597 | 4/1984 | Gortz et al. | 134/18 |
| 4,629,033 | 12/1986 | Moore et al. | 184/6.11 |
| 4,655,927 | 4/1987 | Ford | 210/639 |
| 4,676,905 | 6/1987 | Nagao et al. | 210/646 |
| 4,692,251 | 9/1987 | Hilgren | 210/651 |
| 4,707,269 | 11/1987 | Ohue et al. | 210/651 |
| 4,756,876 | 7/1988 | Dagard et al. | 376/313 |
| 4,759,844 | 7/1988 | Lipschultz et al. | 210/257.2 |
| 4,929,351 | 5/1990 | Sanborn | 210/195.2 |
| 4,994,184 | 2/1991 | Thalmann et al. | 210/251 |
| 5,069,780 | 12/1991 | Thalmann et al. | 210/90 |
| 5,075,002 | 12/1991 | Thalmann et al. | 210/251 |
| 5,091,085 | 2/1992 | Thalmann et al. | 210/321.65 |

FOREIGN PATENT DOCUMENTS 1675618  9/1991  U.S.S.R. .............. 184/6.24

OTHER PUBLICATIONS

Koch Membrane Systems Inc. brochure, Dec. 11, 1989.
Koch Operating Manual, Aug. 1989.
Sanborn/Donaldson brochure, date unknown.
Penberthy Bulletin, date unknown.

*Primary Examiner*—Joseph W. Drodge
*Attorney, Agent, or Firm*—William J. Crossetta

[57] ABSTRACT

A portable ultrafiltration device is disclosed comprising a centrifugal pump, membrane filter and an eductor means, arranged at or before the inlet of the centrifugal pump in a recycle loop from the ultrafiltration system and functioning to replenish filterable fluids and increase the efficiency of the centrifugal pump, coupled with means for controlling the device. Provision is also made for an improved feed mixture pick-up assembly comprising a screening means and a reverse fluid flow arrangement which continuously cleans the screen means to prevent fouling of the pick-up assembly, and the combination thereof with an ultrafiltration device.

35 Claims, 6 Drawing Sheets

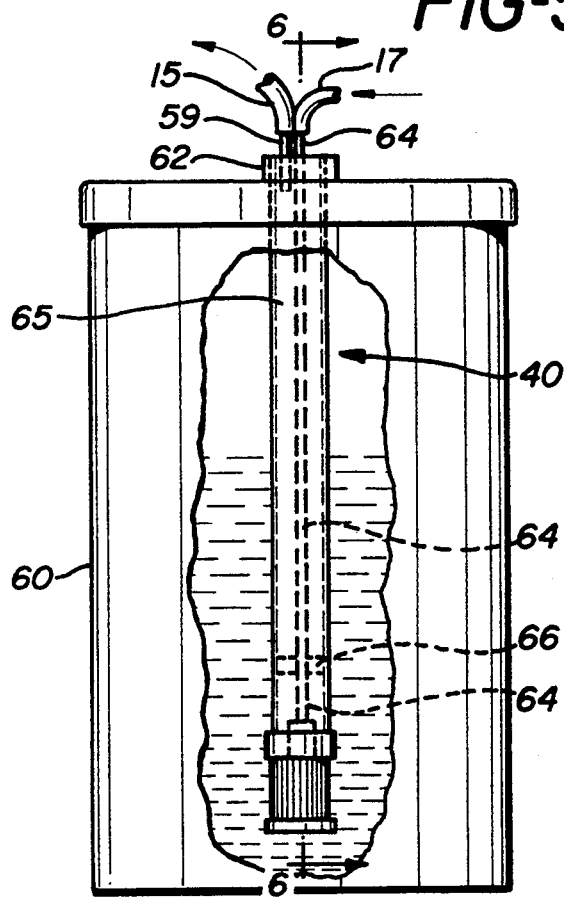
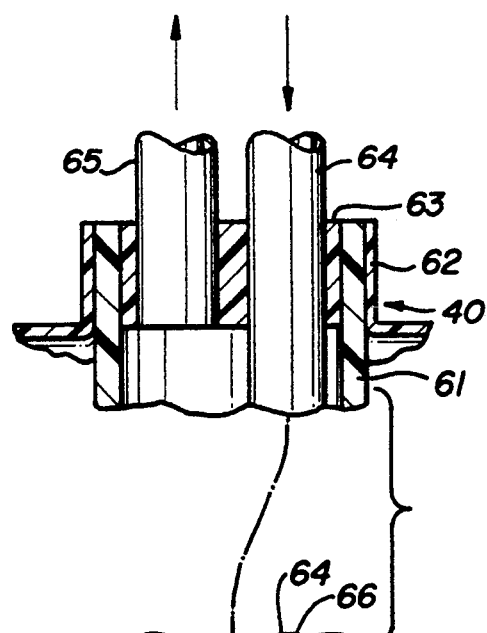
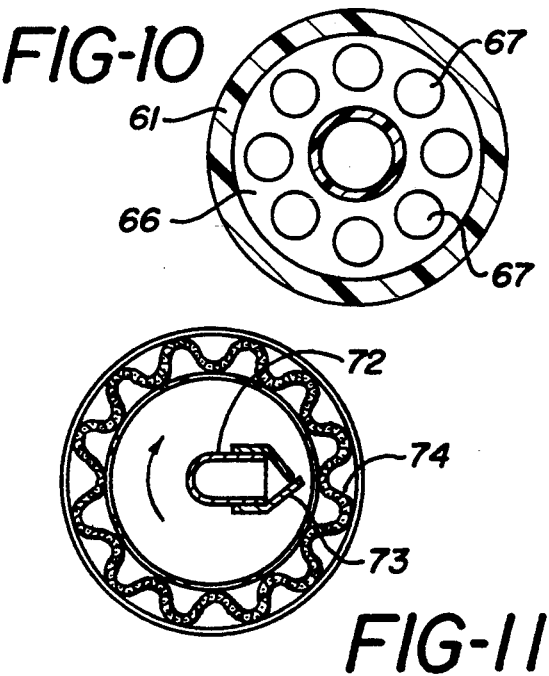
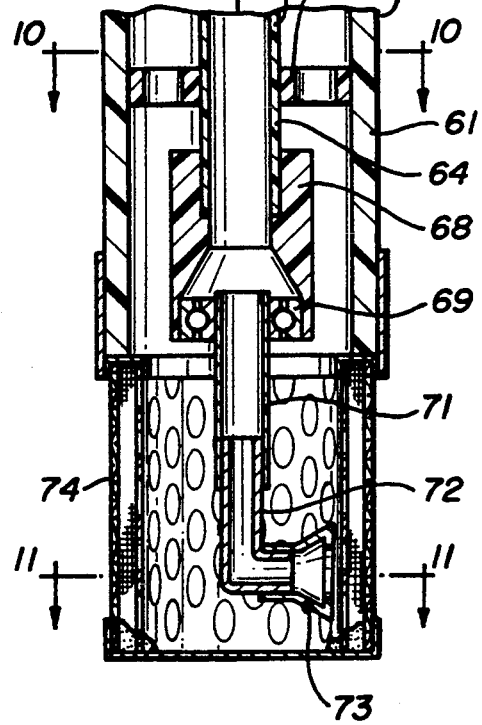
FIG-5
FIG-6
FIG-10
FIG-11

FIG-13
FIG-12
FIG-14
FIG-15
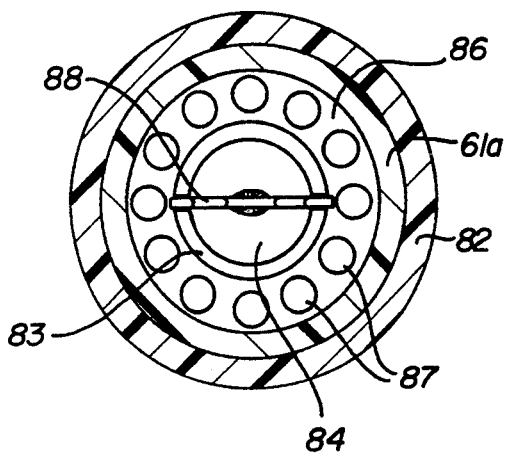
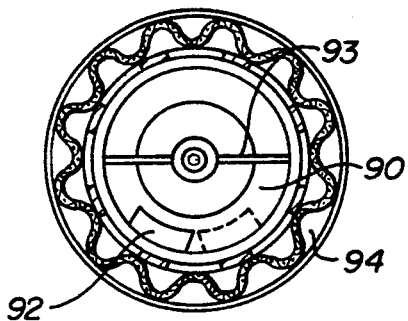
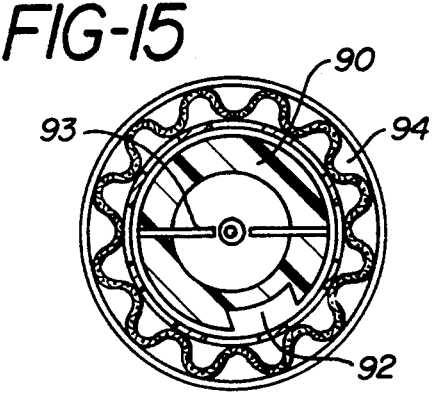
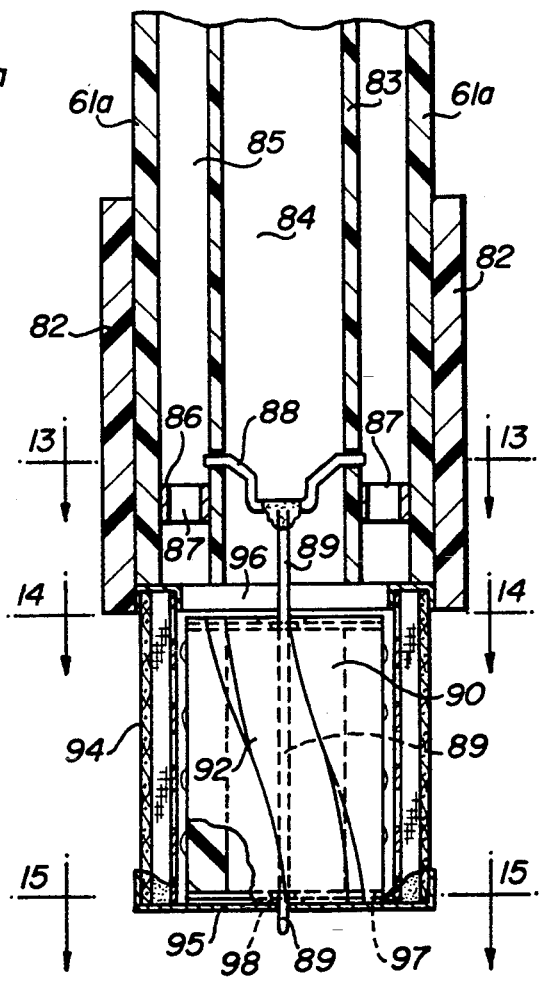

ULTRAFILTRATION SYSTEM AND ASSEMBLY

FIELD OF THE INVENTION

This application relates to an improved assembly for the separation of water from mixtures with larger molecule liquids such as oils, particularly to a new portable ultrafiltration system and assembly comprising a novel fluid pickup assembly and a novel eductor pump ultrafiltration system which enhances the operation of the ultrafiltration process.

BACKGROUND OF THE INVENTION

In our industrialized society it is not unusual to find instances wherein larger molecule liquids have been mixed with water. For example, bilge water typically comprises a mixture of oil with water, as does typical liquid waste collections from automotive repair and wash facilities, machine shops, metal stamping plants, and any number of industrial or repair facilities wherein liquids such as oils, coolants, antifreeze or the like are may be commingled in use or collection with water.

With the increased awareness of society for the environment, there has been an increasing need for means to separate such larger molecule liquids and water mixtures so that clean water can be returned to the environment while the larger molecule liquids can be recovered and recycled for the further use and benefit of mankind. Federal, state and local governments, in response to this increased awareness of society, have promulgated and instituted new laws concerning the handling and disposal of such mixtures, particularly oil/water mixtures, such that it has become increasingly economically desirable to separate out as much water as possible from such mixtures conveniently at the site of commingling, to reduce the volume of liquid to be otherwise collected for recycle or disposal off site. Thus, there is an increasing need for a convenient, portable device which will effectively and economically separate water from larger molecule liquids, particularly petroleum oils, to provide a reduced volume for collection, recycle and disposal at remote sites.

One device which has been proposed and is generally commercially available for the separation of such mixtures is the ultrafiltration device. In a typical ultrafiltration device a fluid containing mixture, such as oils with water is directed, under typically low pressure, to an ultra-filtration membrane. The ultra-filtration membrane comprises microscopic hydrophilic pores which will allow water to pass through the membrane but resist the passage of the oil molecules. Such selective activity is a function of the membrane, achieved through a combination of membrane characteristics including pore size, liquid contact angle and liquid surface tension. The membrane is typically arranged in a cross flow configuration wherein a feeds-from a water-/oil mixture flows across the ultrafiltration membrane in such manner that the oil component of the mixture does not flow through the membrane but a portion of the water in the mixture will permeate the membrane at a low but acceptable pass-through rate. Thus, water flowing through the membrane comprises essentially no oil and can be recovered or wasted, in many instances without further treatment, while the treated mixture which does not permeate the membrane has an increased oil to water ratio. Typically the treated oil mixture, having an increased oil to water ratio, is returned to the feed mixture and is continually recycled in mixture with the feed mixture until the amount of water in the water/oil feed mixture has been significantly reduced.

Ultrafiltration devices of the type above described have typically been cumbersome units that require costly tending by the operator during the separation process to avoid harm to the membranes. Generally such prior art devices require extensive and complex disassembly procedures for routine cleaning and/or maintenance and as a result such units have not enjoyed a level of commercial success that might otherwise be expected. Such low pressure devices of the prior art also typically require about 24 hours or more to separate enough water from a 190 Liter container containing a typical 90:10 (water:oil) mixture to achieve a significantly concentrated typical 50:50 (water:oil) mixture while attaining an essentially oil free water waste containing less than about 50 ppm of oil.

Various improved ultrafiltration devices are disclosed in U.S. Pat. Nos. 4,994,184, 5,069,780 and 5,075,002 which utilize a unique combination of components that provide increased efficiency in a low pressure ultrafiltration process and significantly reduce the time required to obtain a satisfactory water:oil mixture and provide an essentially oil free waste. Though such improved devices have enjoyed commercial success, there is a continuing desire to further reduce processing time, save energy costs associated with the process and resolve various of the problems associated with typical pre-filter requirements.

It is an object of the instant invention to provide a portable ultrafiltration device, capable of separating water from larger molecule liquids such as oils, coolants, antifreeze and the like, to attain water waste containing less than about 50 ppm of the larger molecule contaminant that is simplified in operation and disassembly, provides higher pressures along the ultrafiltration membrane to assist in decreasing processing time and is internally protected from harm to costly membranes.

It is a further object of the invention to provide an improved feed mixture pick-up tube comprising a self-cleaning pre-filter means.

Additional objects and advantages of the invention will be set forth in part in the description which follows, and in part may be obvious from the description of the invention that follows, or may be learned by practice of the invention. The objects and advantages of the invention may be realized and attained by means of the instrumentalities and combinations particularly pointed out in the appended claims.

SUMMARY OF THE INVENTION

The instant invention features an ultrafiltration device generally comprising a centrifugal pump, membrane filter cartridges containing membrane elements, an eductor means comprising feed input means at the suction side, return means, waste outlet means and means for controlling the device. Typically, a portable embodiment of the device is mounted to a wheeled support frame. Typically also the device comprises temperature and pressure sensing means, placed to detect temperature and pressure variations of a feed mixture being processed by the ultrafiltration device, and means cooperating with said temperature and pressure means to interdict the operation of the device to prevent damage to the components.

Provision is also made for an improved feed mixture pick-up assembly comprising a means for directing reverse fluid flow through a screening means which functions as a pre-filter means for feed mixture pick-up from a particulate laden feed mixture.

BRIEF DESCRIPTION OF THE DRAWINGS

The nature and mode of. Operation of the present invention will now be more fully described in the following detailed description taken with the accompanying drawings wherein:

FIG. 5 is a partial sectional plan view of a holding container comprising an embodiment of a fluid pick-up assembly of the invention.

FIG. 6 is a sectional view of the fluid pick-up assembly of FIG. 5, taken along about line 6—6.

FIG. 10 is a sectional view of the fluid pick-up assembly of FIG. 6, taken along about line 10—10.

FIG. 11 is a sectional view of the fluid pick-up assembly of FIG. 6, taken along about line 11—11.

FIG. 12 is a fragmentary sectional view of the lower end of a further embodiment of a fluid pick-up assembly of the invention.

FIG. 13 is a sectional view of the fluid pick-up assembly of FIG. 12, taken along about line 13—13.

FIG. 14 is a sectional view of the fluid pick-up assembly of FIG. 12, taken along about line 14—14.

FIG. 15 is a sectional view of the fluid pick-up assembly of FIG. 12, taken along about line 15—15.

DESCRIPTION OF THE PREFERRED EMBODIMENT

It will be understood at the outset that the ultrafiltration device of the present invention possesses utility in diverse applications of ultrafiltration wherein water is to be separated from larger molecule liquids. However, in order to facilitate description of the present invention, specific reference will now be made to its use in association with removing water from a water/lubricating oil mixture contained in a standard 190 Liter (55 gallon) or similar reservoir.

Figure 1:
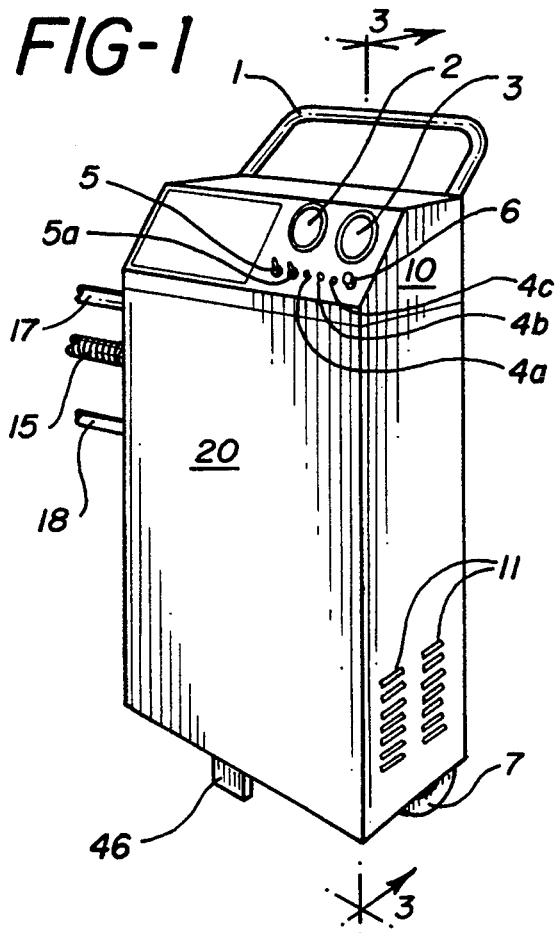
FIG. 1 is a front perspective view of a typical portable ultrafiltration unit of the invention.
Figure 2:
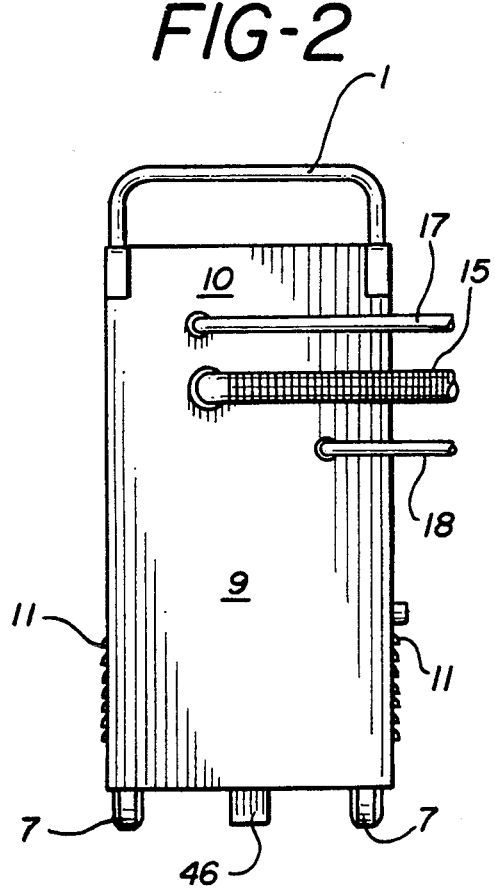
FIG. 2 is a rear plan view of the unit of FIG. 1.
Figure 3:
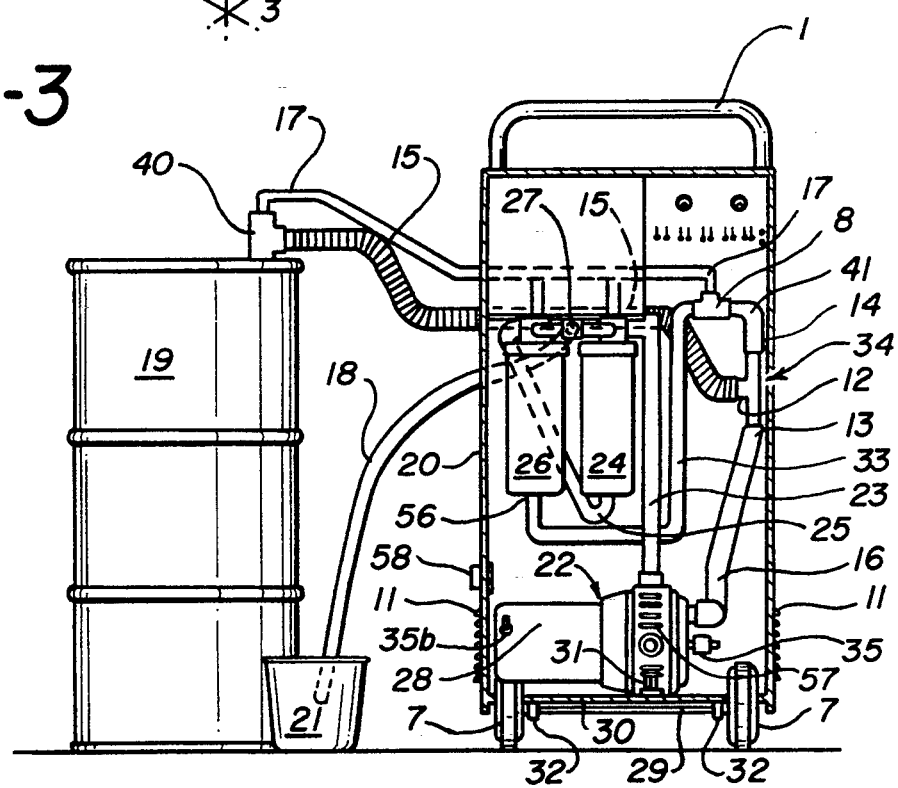
FIG. 3 is a front sectional view taken along about line 3—3 of the ultrafiltration unit of FIG. 1, showing major components of a typical assembly of the interior of the unit, set up in a typical arrangement for ultrafiltration of an oil/water mixture such as a coolant/water mixture contained in a holding container.

FIGS. 1, 2 and 3 illustrate a portable ultrafiltration assembly of the invention as generally including upper frame shroud 10, lower frame shroud 20 and base frame assembly 30, interconnecting to form the general supporting frame of the assembly. Upper frame shroud 10 generally acts in support of the instrumentation and controls of the unit and comprises handle 1 and an instrument control panel comprising temperature indicator 3, pressure indicator 2, indicator lights 4a, 4b and 4c, apparatus on/off switch 5, start/restart switch 5a, and fuse 6. Lower frame shroud 20 is typically louvered 11 to provide means to circulate cooling ambient air through the unit. Centrifugal pump 22 may comprise heat exchange fins 57 for passive exchange of heat to the air from the pump, and fan 58 is provided for forced circulation of ambient air through louvers 11 and about the interior of the apparatus. In circumstances where the ultrafiltration process, particularly the pumping process, generates significantly more heat than can be easily dissipated by fins 57 and/or fan 58, it is contemplated as within the invention to include heat exchange means elsewhere in the process stream. For example, a passive radiation heat exchange means may be incorporated in the feed mixture input and may be interior or exterior to the assembly for dissipation of heat to ambient air, or the system may contain refrigeration capability.

In the portable embodiment, base frame assembly 30 supports axle 29 and comprises axle mounts 32, wheels 7 and support leg 46. Centrifugal pump 22 is driven by motor means 28, is mounted to base frame assembly 30 by mount 31, and contains temperature sensing means 35.

FIG. 2 generally illustrates the rear of the assembly wherein reservoir feed mixture input line 15 and waste water line 18 emerge from rear access panel 9.

Reservoir feed mixture input line 15 connects to suction side 12 of eductor 34 to provide feed mixture input to the ultrafiltration assembly. Feed mixture input connecting line 16 carries the feed mixture from eductor 34 to centrifugal pump 22 of the apparatus. Treated feed mixture return line 17 and waste water line 18 are shown in section and depict fluid lines returning to feed mixture reservoir 19 and waste water receptacle 21 respectively.

FIG. 3 illustrates the general arrangement of components contained in the interior of the ultrafiltration assembly of FIG. 1 together with a typical feed mixture reservoir and waste water receptacle arrangement. Therein, screened feed mixture flows from pick-up assembly 40 through feed mixture input line 15 into suction side 12 of eductor 34, through eductor outlet 13 to feed mixture line 16 where it is directed to centrifugal pump 22. Centrifugal pump 22 pumps the feed mixture through input line 23 to first membrane element containing ultrafiltration cartridge 24. Cross flow filtered feed mixture flowing from cartridge 24 is passed through connecting line 25 and through second membrane element containing ultrafiltration cartridge 26.

The flow arrangement of feed mixture illustrated in the drawings to ultrafiltration cartridges 24 and 26 is a preferred serial flow path wherein the feed mixture comprises a water and petroleum oil mixture and the two ultrafiltration membranes are contained in single chamber cartridges. It should be understood that it is contemplated as within the scope of the invention that the arrangement comprise one ultrafiltration cartridge and that the flow path alternately be a parallel flow path or a combination of serial and parallel flow paths wherein the assembly comprises three or more ultrafiltration cartridges or chambered units.

In the drawings, the treated mixture passes from the ultrafiltration cartridges through connecting line 33 to diverter 8 wherein a portion of the treated mixture is directed through a reduced sized orifice to treated feed mixture return line 17 and then to reservoir 19. Waste water removed during ultrafiltration is collected from cartridges 24 and 26, passes through waste water manifold 27 and is passed through waste water line 18 to waste water receptacle 21. It should be understood that typically the waste water can be directly sewered to waste, or in many instances can be reused.

Figure 4:
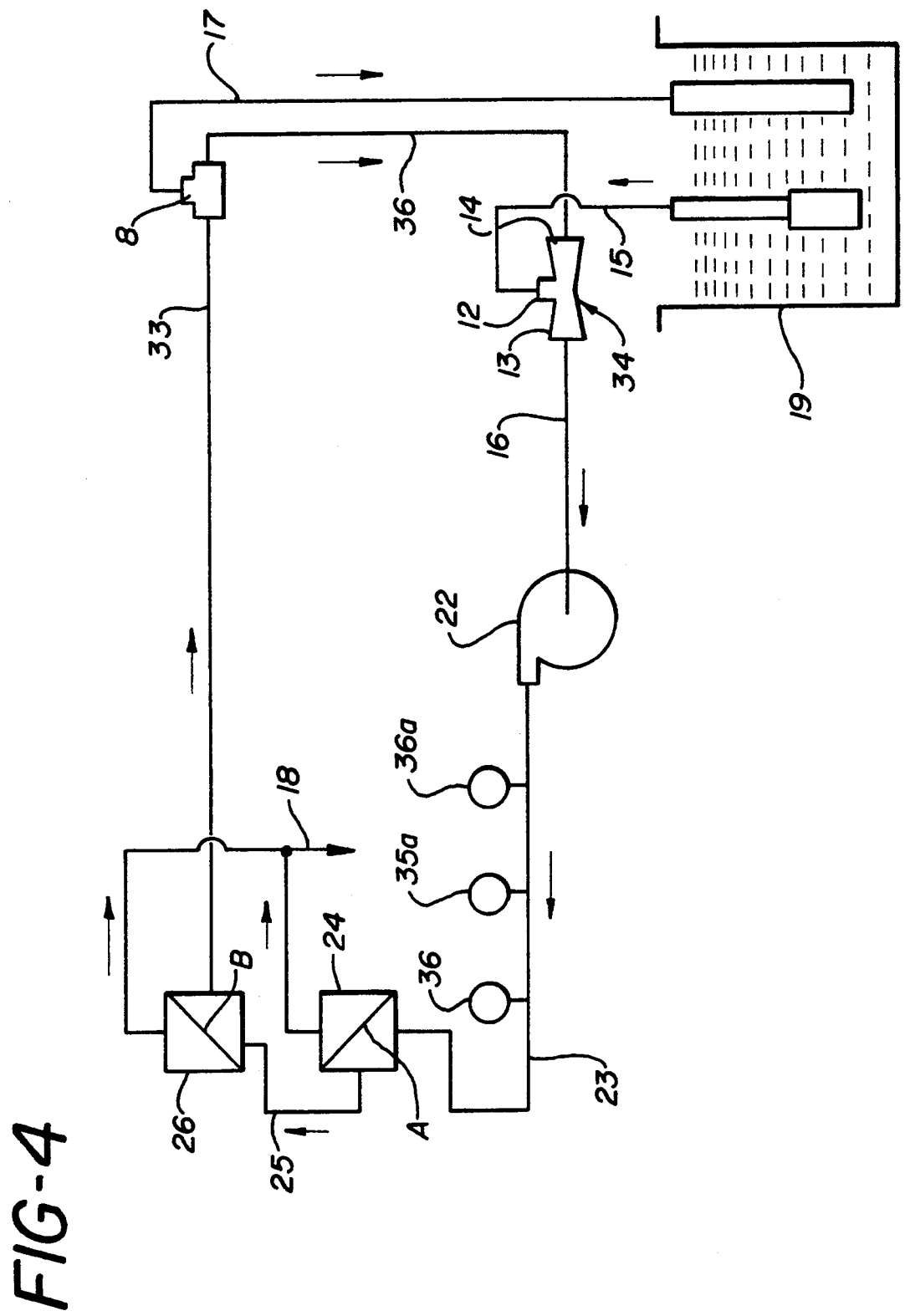
FIG. 4 is a flow diagram showing the fluid flow through a typical ultrafiltration assembly of the invention.

Referring now to FIG. 4, therein is schematically illustrated a preferred arrangement of components for fluid flow through an ultrafiltration unit of the invention, including placement of optional temperature and pressure sensors. Therein, centrifugal pump 22 moves a water/oil feed mixture from feed mixture input line 16 through line 23 to membrane cartridge 24.

Temperature sensing means monitor the temperature of the feed mixture at one or more points in the fluid flow to determine that fluid contacting the ultrafiltration membranes is not heated to a temperature wherein damage to the membrane can result. In the flow schematic of FIG. 4, temperature sensor 35a is preferably placed in the fluid flow between the pre-filter and the ultrafiltration cartridge and temperature sensor 35 is placed within the centrifugal pump. Typically, in situations where the pump is directly interconnected to an electric motor drive as a unit structure, an appropriate thermal switch 35b, which acts to interrupt power to the motor in response to motor heat, can function as an indicator of feed mixture temperature and automatic cut-off of feed mixture flow to the membranes. Generally, a single temperature sensor can be placed to provide adequate monitoring of temperature variations.

Temperature sensors can be arranged in conjunction with a temperature indicator for visual observation and manual control of the unit, however, they are preferably arranged together with an automatic limit switching means for interdicting the flow of fluid through an ultrafiltration cartridge, generally by interrupting power to the circulating pump, upon sensing of a temperature outside the limiting range. In the preferred embodiment of the drawings, a temperature sensor 35 is located at the pump which is coupled with visual temperature indicator 3 provided on the control panel of the upper frame shroud 10. A second temperature sensor 35a is located at ultrafiltration cartridge 24 and also comprises an automatic limit switching means which interrupts power to the circulating pump 22 upon sensing a temperature outside a preset range. In the illustrated invention, indicator light 4c at the control panel of the upper frame shroud turns on when the circulating pump has been interdicted by exceeding temperature limits. It should be understood that contemplated as within the scope of the invention is placement of such temperature sensing means and/or automatic limit switching means elsewhere in the ultrafiltration unit, as for example temperature sensor 35b can be located in the electric motor of the pump and will interrupt operation of the motor upon exceeding a preset temperature, or, placing temperature sensing means at a point in the fluid stream at or beyond the ultrafiltration cartridges and adjusting interdiction to occur at adjusted temperatures. Though it has been found convenient in the embodiment of the invention illustrated in the figures to manually restart the system, after interdiction, by manual restart switch 5a, it is also contemplated as within the invention to include automatic switching means that reconnects current to the circulating pump upon sensing a return of the temperature of the feed mixture to the desired temperature range or after a preset time interval.

In general, temperature interdiction limits depend upon the physical limits of the ultrafiltration membrane element. The ultrafiltration assemblies of the instant invention comprise spiral wound ultrafiltration membranes sandwiched to form chambers with glued separators therebetween which form the membrane element. Typically it has been found that feed mixture temperatures which are less than about 0° Centigrade create processing difficulties because of significantly increased viscosity of the feed mixture. Temperatures exceeding about 95° Centigrade generally create processing difficulties by weakening the ultrafiltration membranes which can significantly reduce the efficiency of the ultrafiltration process. Though both low and high temperature limit switching is contemplated as within the invention, generally low temperature switching is obviated by simple observation of the operator and is not typically a desired component of the invention. Typically temperature sensors which are suitable for use in the invention in interrupting the power to a circulating pump are those having an upper temperature limitation above about 65° degrees Centigrade, while those having a temperature limitation above about 50° degrees Centigrade are preferred.

Pressure sensing means 36 are placed to monitor the pressure of the feed mixture at one or more points in the fluid flow so that fluid contacting an ultrafiltration membrane is within an efficient ultrafiltration pressure range and wherein damage to the membrane and/or circulating pump can be avoided. At least one pressure sensor is preferably placed in the fluid flow at a point from the circulating pump to inlet 14 of eductor 34. A most preferred placement is between the circulating pump and a final ultrafiltration membrane. Pressure sensors can be arranged in conjunction with a pressure indicator for visual observation and manual control of the unit, however, they are preferably arranged together with an automatic limit switching means to interdict the flow of fluid through an ultrafiltration membrane. Generally interdiction is achieved by interrupting the power operating the circulating pump, upon sensing of a pressure outside the limiting range. Most preferably the pressure sensing means comprises a high and/or low pressure sensing switch that automatically turns off the circulating pump upon exceeding preset pressure limits. The device control panel will indicate interruption of the circulating pump at indicator light 4a so that the operator is aware of the status of control. In the preferred embodiment of the drawings, ultrafiltration cartridges 24 and 26 can comprise a pressure sensor 36 on the feed mixture side of the membranes. Pressure sensor 36a provides input to pressure indicator 2 for visual observation of pressure, while pressure sensor 36 comprises an automatic limit switching means which interrupts power to the circulating pump 22 upon sensing a pressure outside a preset range. In the illustrated invention, indicator light 4a at the control panel of the upper frame shroud turns on when the circulating pump has been interdicted by exceeding pressure limits.

Though it has been found convenient in the embodiment of the invention illustrated in the figures to manually restart the system, after interdiction, by manual restart switch 5a, it is also contemplated as within the invention to include automatic switching means that reconnects current to the circulating pump and can restart the circulating pump when the desired pressure ranges are again attained.

In general, pressure interdiction limits depend upon the physical limits of the ultrafiltration membrane as well as the fittings and materials of construction of the assembly. Typically, spiral wound membranes can handle pressures well in excess of 200 psi. Generally, it is more time efficient to run a spiral wound membrane system at higher pressures with appropriate matching of flow rates.

Returning now to FIG. 4, feed mixture is pumped out of the centrifugal pump, under pressure, and flows by means of input line 23 to the first ultrafiltration cartridge 24, wherein it contacts, under pressure in cross-flow, membrane A. Water contained in the mixture crosses the ultrafiltration membrane for wasting through generally non-pressurized or suction enhanced, waste water line 18. The feed mixture, still under pressure from the action of the circulating pump, exits the first ultrafiltration cartridge 24 through connecting line 25 and is transported to ultrafiltration cartridge 26. Still under pressure, the feed mixture contacts ultrafiltration membrane B wherein water contained in the mixture crosses the membrane for wasting through waste water line 18. The treated feed mixture flows through line 33 to diverter means 8. Diverter means 8 merely comprises an outlet through which a portion of the treated feed mixture can flow through line 17 back to the feed mixture reservoir 19. The non-diverted treated feed mixture flows, under a maintained pressure, through line 36 to inlet 14 of eductor 34.

The diversion of the treated feed mixture through line 17 is restricted to assist in maintaining fluid pressure in the system. Generally, any suitable means to accomplish the restriction can be used, such as a restricting orifice, restricting line or the like. Preferably, the restriction comprises a restricting line.

Eductor 34, generally also known as an ejector, syphon, exhauster and/or jet pump, comprises a venturi wherein an activating fluid flowing from inlet 14 to outlet 13 creates a suction through suction inlet 12. The venturi, being a restrictive passage, also restricts the fluid flow through line 36 thus assisting in maintaining fluid pressure in the system. Thus, as treated feed mixture flows under pressure through eductor 34, a suction is created at suction inlet 12 which causes additional feed mixture to flow from reservoir 19 through feed mixture input line 15, through suction inlet 12, which combines with the treated feed mixture that is passing through the venturi of eductor 34 from eductor input line 41, to constitute the feed mixture that flows through feed mixture line 16 into circulating pump 22.

The eductor provides multiple roles in the system of the invention. It acts as a pressure control orifice to maintain pressure within the system from the pump to the eductor and thus maintain a feed mixture stream pressure against the ultrafiltration membrane and maintain a minimal change in fluid pressure ($\Delta p$) along the length of the ultrafiltration membrane. It also acts as a suction pump to pump feed mixture from the reservoir to the input side of the circulation pump and as a suction pressure boost to the centrifugal pump receiving the feed mixture.

The operating efficiency of a given ultrafiltration membrane unit is typically dependent upon an optimum preferred rate of fluid flow along the membrane and an optimum pressure of such fluid against the membrane. Generally, the attaining of optimum operating efficiency of an ultrafiltration membrane has been further limited by the inability to match optimum flow rates with optimum pressure in conveniently available commercial centrifugal pumps.

In U.S. Pat. No. 5,075,002 an ultrafiltration system comprising a cartridge type spiral wound membrane, was disclosed wherein the flow of fluid along the membrane was controlled by incorporating a flow restricting orifice in the system beyond the membrane. The steady state pressure against the membrane, for any flow restricting orifice, was a function of the pressure developed by the centrifugal pump driving the system and for a given flow rate was limited by the size of the pump, the motor driving the pump and the design of the impeller. Thus in such system utilizing conventionally available centrifugal pump and impeller design, an increase in steady state pressure at a desirable flow rate requires bigger pumps and/or motors which means an inconvenient increase in motor size and/or increase in power consumption.

Interestingly, I have found that steady state pressure against the membrane can be increased in such system without resorting to unique designed centrifugal pumps and/or increased sized pumps and/or to increased size motors and/or increasing power consumption. I have found that by providing an eductor in a partial recycle loop of a centrifugal pump driven ultrafiltration system, the steady state pressure of the system for a given flow rate can be increased without corresponding increase in the motor size and/or power consumption of the centrifugal pump.

Though I do not wish to be bound by the following, what appears to be happening is that the eductor provides pressurized fluid at the centrifugal pump intake, thus boosting the suction pressure at the intake. The boost in suction pressure reduces the amount of kinetic energy that would otherwise be used by the centrifugal pump to draw fluid from the reservoir. Thus, at least a portion of the kinetic energy usually expended by the centrifugal pump to suck fluid into the pump is expended by the pump in increasing the pressure at the outlet side of the pump and the kinetic energy of the increased pressure from the outlet of the pump is used by the eductor to boost the suction pressure on the intake side of the pump. When the pump reaches a desired steady state flow rate, as controlled by the restriction of diverted return mixture and the restriction of the orifice of the eductor venturi, the amount of energy needed to drive the pump is reduced and there is a corresponding decrease in motor power consumption.

The eductor appears to be participating in the system as a conservator of energy. When the system merely comprises a restrictive orifice, the kinetic energy which has been imparted to the fluid by the centrifugal pump dissipates to the reservoir and/or atmosphere on exiting the restriction. When the restrictive orifice comprises an eductor, the exit of the restrictive orifice comprises a suction tap which uses the kinetic energy from the fluid to pump additional fluid to the circulating pump. Thus, the kinetic energy of the fluid entering the circulating pump becomes in part additive to the kinetic energy developed by the pump, which in turn is imparted to the fluid flowing therefrom in the form of increased pressure.

The selection of the restriction of the diverted return feed mixture and the size of the orifice of the eductor is dependent upon the operating characteristics of the pump and the characteristics of the fluid transmission system from the circulating pump to the orifice. Generally, it is preferred that the characteristics of the pump and the system be such as to provide the desired fluid flow rate and produce an output head from a non-pressurized intake which is sufficient, when restricted by the orifice of the eductor and the diverted restricted feed mixture return, to provide less than 100% of the desired pressure at the ultrafiltration membrane. I have found that with careful selection and matching of the eductor orifice and the restricted feed mixture return the pressure of the system, when provided with suction feed pressure boosting from the eductor, can be raised from 10 to 50% over that of a non-suction feed boosted system.

I have found that when using commercially available spiral wound membranes it is preferable that the pressure be maintained at from about 50 to about 95 lbs/in$^2$ pressure and most preferable when the pressure is from about 70 to about 90 lbs/in$^2$. Operating the assembly under such conditions has acted to reduce the water content of a 90:1 water oil mixture contained in a 190 Liter (55 gallon) container to a 50:50 mixture in less than 4 hours in experimental tests.

Figure 7:
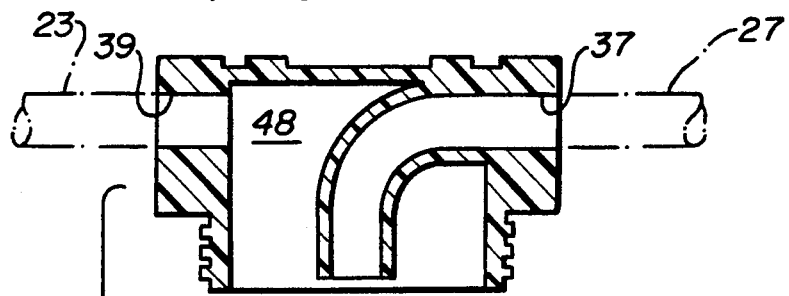
FIG. 7 is an enlarged fragmentary sectional view of a cartridge assembly of FIG. 3 containing a ultrafiltration membrane element.
Figure 8:
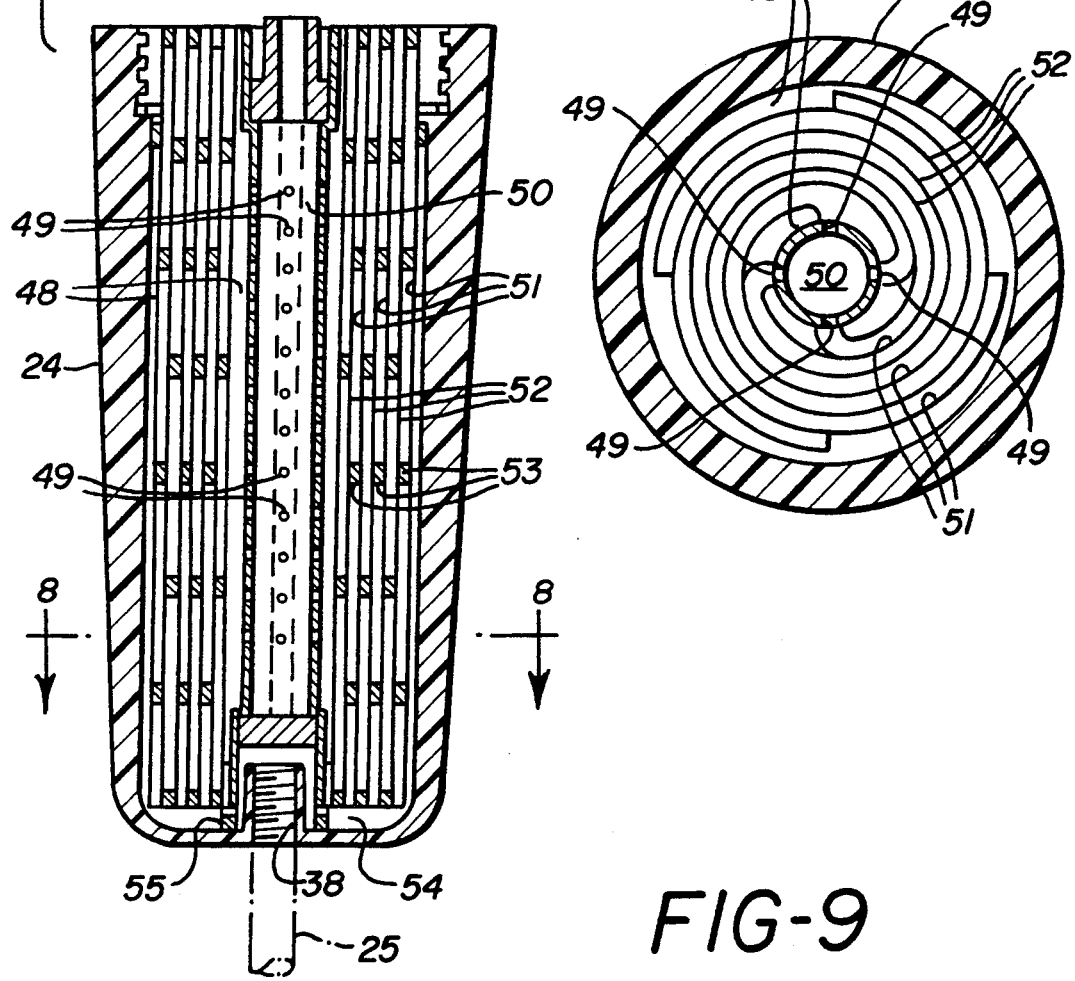
FIG. 8 is a top sectional view taken along about line 8—8 of FIG. 7.

FIGS. 7 and 8 illustrate a typical ultrafiltration membrane cartridge containing a membrane element operable with the invention. Therein is shown a typical first ultrafiltration cartridge 24 wherein feed mixture is transported through feed mixture input line 23 to cartridge feed mixture inlet 39. Therein it flows from collection chamber 48 through passages 51 between sandwiched, spiral wound, ultrafiltration membranes 52, the sandwiched membranes being held apart by separators 53. Feed mixture flowing from between the sandwiched membranes is collected at cartridge lower area 54 and flows through spacer 55, through feed mixture outlet 38 into connecting line 25. Water diffusing through ultrafiltration membranes 52 collects within the sandwiched membranes, flows through openings 49 to central chamber 50 and out cartridge waste water outlet 37 to waste manifold 27.

Figure 9:
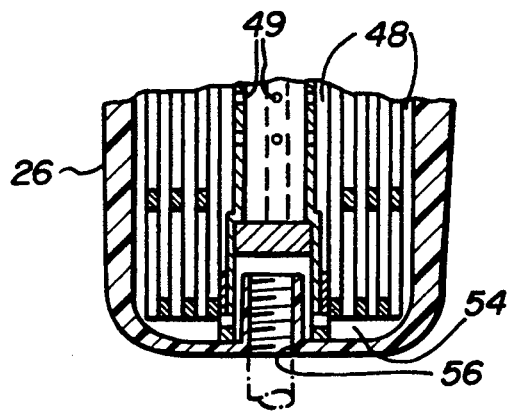
FIG. 9 is an enlarged fragmentary sectional view of a cartridge assembly of FIG. 3 taken in the area designated FIG. 9.
Figure 16:
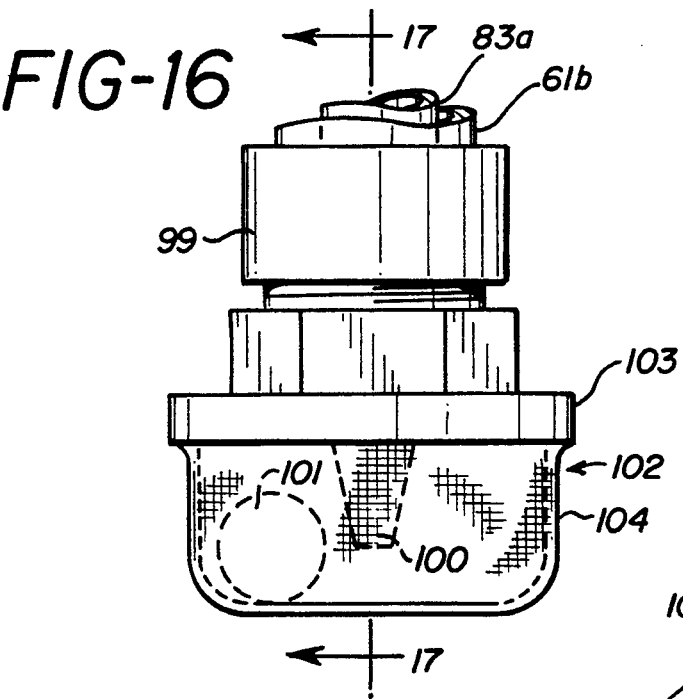
FIG. 16 is a fragmentary view of the lower end of a further embodiment of a fluid pick-up assembly of the invention.
Figure 18:
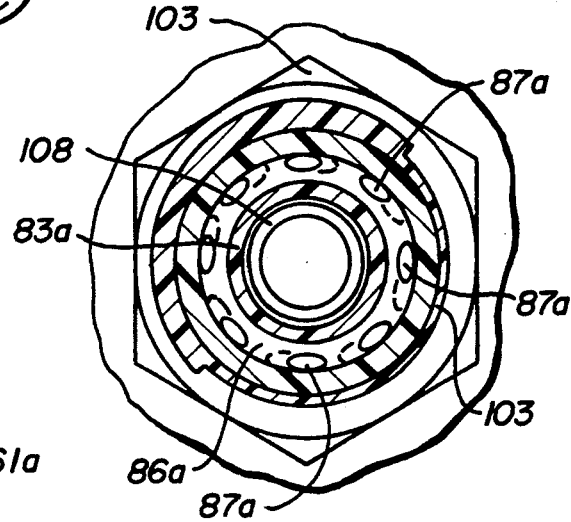
FIG. 18 is a sectional view of the fluid pick-up assembly of FIG. 16, taken along about line 18—18 of FIG. 17.
Figure 17:
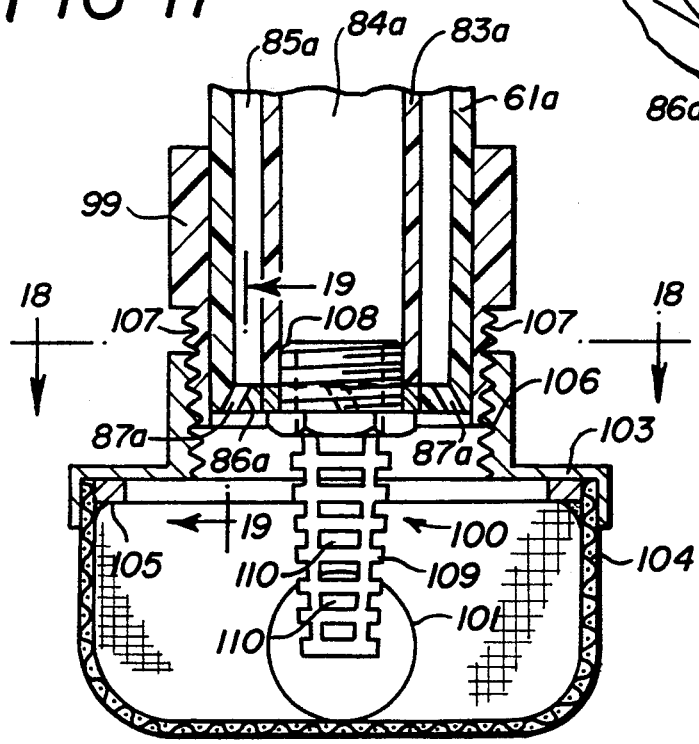
FIG. 17 is a sectional view of the fluid pick-up assembly of FIG. 16, taken along about line 17—17.
Figure 19:
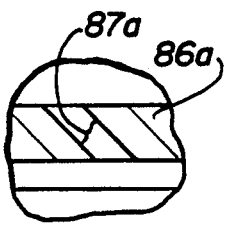
FIG. 19 is a sectional view of the fluid pick-up assembly of FIG. 16, taken along about line 19—19 of FIG. 17.

FIG. 9, illustrates the configuration of the lower area of cartridge 26 in FIG. 3, wherein outlet 56 inputs treated feed mixture to diverter 8 through line 33.

Ultrafiltration membrane elements especially useful in the assemblies of the invention comprise spiral wound configured, cartridge type membrane elements which resist flow therethrough of molecules having a molecular weight greater than water. Typically such membranes have an operating pH range of about 2–11, an operating pressure range of from about 40–400 psi and an operating temperature range up to about 65° Centigrade. Polysulfone containing base membranes have been found to be particularly suitable for the ultrafiltration assembly of the invention, particularly membrane cartridges containing elements comprising a gross contact area of from about 1.5 to about 9 Meters$^2$ and most preferably about 2.75 Meters$^2$.

Though the various feed mixture pick-up assemblies of the prior art are suitable for use with the ultrafiltration device of the invention, assemblies that comprise a means for filtering and/or otherwise screening particulate matter from the feed mixture and one which comprises a self-cleaning filtering and/or screening means is most desirable.

I have found that in processes wherein a stream of fluid is being pumped into a fluid reservoir coincidentally with a fluid stream being pumped out, such as the process of the ultra-filtration device of the invention, that a novel combination of components allows the fluid being pumped into the reservoir to be utilized to enable self-cleaning of a particulate screening means. By particulate screening means is meant the various mesh screens, porous membranes, films or the like materials which are commonly adapted to comprise passageways which are sized to allow the flow of fluids therethrough but which form a barrier to the flow of particulate matter that may exceed such size.

By adopting the feed mixture pick-up assembly to direct fluid flowing into the reservoir to cause a recurrent reverse flow of fluid through minor portions of the particulate screening means, coincidentally with the forward pumping of fluid from the reservoir through other portions of the screening means, the screening means can be regularly cleaned to resist clogging without interruption of the process of pumping fluid from the reservoir.

FIGS. 5, 6, 10 and 11 illustrate an embodiment of a self cleaning pick-up assembly which is particularly suitable for use with the ultrafiltration assembly of the invention. FIG. 5 shows a pick-up assembly 40 engaging reservoir 60. The pick-up assembly is illustrated as comprising a housing designated as hollow support tube 61 comprising drum fitting 62 for engaging an access aperture of reservoir 60, which is illustrated as comprising a 55 gallon drum. Hollow support tube 61 comprises upper seal 63, which engages a feed mixture return passageway illustrated as central return tube 64 and a fluid outlet passageway 65 which is illustrated as concentric to return tube 64 and further comprises outlet tube 59 in fluid communication with passageway 65. Spacer 66 engages feed mixture return tube 64 and comprises holes 67 through which fluid can flow from the fluid pick-up subassembly to outlet passageway 65.

In use with the ultrafiltration device of the invention, the feed mixture return tube is in fluid communication with feed mixture return line 17 of the device and outlet tube 59 is in fluid communication with feed mixture input line 15.

The fluid pick-up subassembly generally comprises bearing housing 68 which engages an end of feed mixture return tube 64, bearing 69 which is mounted in said housing, connecting tube 71, angle tube 72 and nozzle 73. Connecting tube 71 is mounted to bearing 69 such that it is rotatable around about the longitudinal axis of fluid flow from feed mixture return tube 64 though housing 68 and bearing 69. Connecting tube 71 is connected to angle tube 72 which in turn is connected to nozzle 73.

Screen 74 surrounds angle tube 72 and is coupled to support tube 61 by coupling means 75. Angle tube 72 is configured to comprise an angle therein such as to direct the flow of fluid at an angle, preferable about a 90° angle, to the longitudinal axis of connecting tube 71. Nozzle 73 comprises a restriction at its outlet and is configured to direct fluid flow at a tangent to the direction of the longitudinal axis of connecting tube 71 and against screen 74.

In such embodiment, the restriction at the nozzle maintains a pressure in the fluid flowing through feed mixture return assembly. The change in direction of fluid flowing from along about the longitudinal axis of the assembly through an outlet in a direction tangential to such longitudinal flow causes rotation of the nozzle, angle tube and connecting tube which is facilitated by the bearing. Fluid flowing from the rotating nozzle hits against and flows through the screen as the nozzle rotates thus dislodging particles which may be laying against and within the holes of the screen.

In a typical operating arrangement outlet tube 59 of the fluid pick-up assembly has a suction imposed thereon from a pump means. In combination with the ultrafiltration device of the invention, outlet tube 59 would be connected to the suction side of the eductor through feed mixture input line 15. Fluid from the reservoir would be drawn through screen 74, through holes 67 of spacer 66 into outlet passageway 65, though outlet tube 59 and through input line 15 to suction side 12 of eductor 34. Partially diverted fluid from the diverter of the ultrafiltration device would pass through line 17 to feed mixture return tube 64 to the fluid pick-up subassembly wherein it would pass through screen 74 and to the reservoir.

It should be understood that various embodiments of the fluid pick-up subassembly are contemplated as falling within the broad description of the invention. For example it is contemplated that the subassembly comprise a sphere such as a ball or the like, which is confined within a passageway between an outlet of fluid being returned to the reservoir and a means for screening fluid being pumped from the reservoir. The action of the fluid exiting the opening of the outlet and hitting against the sphere causes it to rotate and/or move about the confined passageway such that the sphere presses against the screen causing fluid to be squeezed though the holes therein and causing particulate matter which may be clogging the screen back into the reservoir.

Similarly, by further example, the means for directing fluid flowing from the outlet of fluid being returned to the reservoir may comprise a slotted rounded member, which rotates about an axis with the passage of fluid through the slot and splashes fluid against the screen to effect reverse flushing of the screen.

FIGS. 12–15 and 16–19 illustrate embodiments of the aforesaid exemplified pick-up subassemblies specifying only the fluid pick-up ends of the assemblies, which coact with the fluid in the reservoir. In an ultrafiltration application such as that of the invention, passageways 85 and 85a comprise fluid return passageways which engage return line 17 of the illustrated ultrafiltration device and passageways 84 and 84a comprise fluid outlet passageways that engage feed mixture suction input line 15.

In the embodiment illustrated in FIGS. 12–15, the housing is illustrated as comprising a hollow support tube 61a having a central tube 83 defining fluid outlet passageway 84 which cooperates with spacer 86, comprising passageways 87, to form discrete concentric fluid return passageway 85.

Outlet passageway 84 engages the feed mixture return subassembly which comprises axle support frame 88, axle 89 and slotted rotatable cylinder 90 which has an angular external slot 92 and an internal hollow passageway 91 that comprises a central support frame 93 for rotatably mounting the cylinder to the axle. Cylindrical screen 94 is mounted in spaced concentric relationship to cylinder 90 and comprises a plate 95 having a central hole for mounting the screen on axle 89. The screen is mounted in an arrangement such that pressurized fluid flowing from the ultrafiltration device through return passageway 85 flows through passageways 87 of spacer 86, through open end 96 of cylindrical screen 94 and engages slot 92 of rotatable cylinder 90.

Rotatable cylinder 90 is loosely mounted to axle 89 and arranged such that fluid flowing through the angular shape of slot 92 causes cylinder 90 to rotate about axle 89, in a manner similar to fluid engaging blades of a turbine to cause it to spin. Cylindrical screen 94 is cooperatively mounted with collar 82, spaced from rotatable cylinder 90, such that rotation of cylinder 90 causes fluid flowing through slot 92 to splash against and through screen 94, carrying particulate material which may be lying against and within the holes of screen 94 along with it into the reservoir.

Feed mixture input line 15 of the ultrafiltration device is in fluid communication with central fluid outlet passageway 84 which is in fluid communication with internal hollow passageway 91 of cylinder 90. End 97 of cylinder 90 is arranged in spaced relationship to plate 95 of screen 94, by means of spacer 98, such that fluid can flow therebetween.

In the operation of the fluid pick-up assembly of this embodiment, a fluid suction is imposed by pump means of the ultrafiltration apparatus through feed mixture input line 15 which is in screened fluid communication with the reservoir through the spaced relationship of hollow passageway 91 with plate 95 of screen 94. Coincidentally, fluid pressure is imposed by pump means of the ultrafiltration apparatus through return line 17 which is in screened fluid communication with the reservoir through the spaced relationship of slot 92 with screen 94. Thus, fluid flows from the ultrafiltration device to the reservoir through those areas of screen 94 which are adjacent slot 92 at any point of rotation of cylinder 90; and, fluid flows from the reservoir through screen 94 to the internal hollow passageway from those areas of screen 94 which are not adjacent slot 92.

It has been found that the force of the fluid flowing through the screen into the reservoir tends to create a turbulence in the reservoir at least in the area of the fluid pick-up end of the fluid pick-up apparatus which tends to keep the screen from clogging with particulate matter and provide a continuing mixing of returning fluid with the reservoir fluid.

In the embodiment illustrated in FIGS. 16–19, the housing is illustrated as comprising a hollow support tube 61b having discrete central tube 83a defining fluid outlet passageway 84a which cooperates with spacer 86a, having passageways 87a, to form discrete concentric fluid return passageway 85a.

The feed mixture pick-up subassembly generally comprises threaded coupler 99, slotted hollow guide 100, ball 101 and screen assembly 102. Screen assembly 102 comprises screen housing 103 having threads 106, rounded screen 104 and screen attachment ring 105. Coupler 99 is generally glued or otherwise engaged to hollow support tube 61b and comprises threads 107 for cooperating engagement with threads 106 of screen housing 103. Rounded screen 104 is mounted to housing 103 in cooperative engagement with attachment ring 105, generally by gluing or the like. Hollow guide 100, comprises attachment end 108 and conical guide section 109 comprising slots 110. Guide 100 is mounted to central outlet passageway 84a such that slots 110 are in fluid communication therewith and is arranged in spaced relationship to rounded screen 104 such that ball 101 can freely travel in a path around conical guide section 109 of hollow guide 100 within the confines of screen 104.

Passageways 87a of spacer 86a are angled such that path of pressurized fluid diverted through line 17 from the ultrafiltration device through return passageway 85a is diverted by angular passageways 87a of spacer 86a to engage ball 101 and cause the ball to move in a path around guide 100 pressed against screen 104. Fluid which is in the feed mixture pick-up subassembly between the ball and the screen, is squeezed by the force of the ball being pressed against the screen and is forced through screen 104, carrying particulate material which may be lying against and within the holes of screen 104 along with it into the reservoir.

Feed mixture input line 15 of the ultrafiltration device is in fluid communication with central fluid outlet passageway 84a of the housing which is in fluid communication with hollow guide 100 and slots 110 of the feed mixture pickup subassembly such that fluid suction pumping by the ultrafiltration device, pumps fluid from the subassembly which is replenished by flow of fluid through the screen from the reservoir.

In the operation of the fluid pick-up assembly of this embodiment, a fluid suction is imposed by pump means of the ultrafiltration apparatus through feed mixture input line 15 which is in fluid communication, through passageway 84a, slots 110 and screen 104 with the reservoir. Coincidentally, fluid pressure is imposed by pump means of the ultrafiltration apparatus through return line 17 which is in screened fluid communication with the reservoir through passageway 85a, spacer passageways 87a and screen 104. Thus, fluid flows from the ultrafiltration device through those areas of screen 104 which are adjacent ball 101 at points of travel of the ball along its path to the reservoir; and, fluid flows from the reservoir through screen 104 to the outlet passageway 85a from those areas of screen 104 which are not adjacent the ball.

It should be understood that various modifications of the illustrated assemblies are evident therefrom which can be seen as providing equivalent functions in the assembly, each of which are contemplated as within the scope of this invention.

I claim:

1. An ultrafiltration assembly comprising: centrifugal pump means having an inlet and an outlet; eductor means having an inlet, an outlet and a suction inlet; means for transporting influent liquid feed from a reservoir source to said suction inlet of said eductor means; means for transporting liquid feed from said outlet of said eductor means to said inlet of said centrifugal pump means; membrane filter means comprising a liquid feed treatment zone, a liquid feed inlet, a treated liquid outlet and having a hydrophilic ultra-filtration membrane through which a select molecular weight liquid can pass from said liquid feed treatment zone to a select liquid receiving zone; means for transporting liquid feed from said outlet of said centrifugal pump means to said liquid feed inlet of said membrane filter means; means for transporting treated liquid from said treated liquid outlet of said membrane filter means to said inlet of said eductor means; means for transporting treated liquid from said membrane filter means to said reservoir source; wherein said means for transporting said treated liquid to said reservoir cooperates with said centrifugal pump means to maintain a liquid feed pressure of from about 45 to about 100 lbs/in$^2$ in at said membrane.

2. The ultrafiltration assembly of claim 1 comprising at least one of temperature or pressure sensor means.

3. The ultrafiltration assembly of claim 2 comprising means cooperating with said sensor means for interdicting the operation of said centrifugal pump means.

4. The assembly of claim 3 comprising means cooperating with said sensor means for overriding interdiction of said pump means.

5. The assembly of claim 2 wherein said sensor means comprises a temperature sensor, mounted to detect temperature variation of said liquid feed at said pump means.

6. The assembly of claim 5 wherein said temperature sensor comprises a thermal switch.

7. The assembly of claim 5 comprising visual temperature indicator means.

8. The assembly of claim 2 wherein said sensor means comprises a pressure sensor, mounted to detect pressure variation of said liquid feed.

9. The assembly of claim 8 comprising visual pressure indicator means.

10. The assembly of claim 2 wherein said sensor means engages visual display means.

11. The ultrafiltration assembly of claim 1 wherein said select liquid receiving zone comprises a water receiving zone which is separated from said liquid feed zone by said membrane.

12. The ultrafiltration assembly of claim 1 wherein said influent liquid feed is pre-filtered, prior to passage to said membrane filter means, through a filter means sufficient to filter particles from said liquid feed mixture.

13. The assembly of claim 12 wherein said influent liquid feed is pre-filtered by a pre-filter means comprising a screening means which filters out particles having a size greater than about 100 microns.

14. The assembly of claim 1 wherein said influent liquid feed comprises water and a liquid having a molecular weight greater than water.

15. The assembly of claim 14 wherein said influent liquid feed comprises oil and water.

16. The assembly of claim 15 wherein said influent liquid feed comprises petroleum oil and water.

17. The assembly of claim 14 wherein said influent liquid feed comprises coolant and water.

18. The assembly of claim 1 comprising a support frame.

19. The assembly of claim 18 wherein said support frame is mounted to wheels.

20. The assembly of claim 1 wherein said membrane filter means comprises membrane filter assemblies.

21. The assembly of claim 20 comprising two membrane filter assemblies.

22. The assembly of claim 20 wherein said membrane filter assemblies are arranged in serial flow communication.

23. The assembly of claim 20 wherein at least one of said membrane filter assemblies comprise at least two, juxtaposed, liquid feed inlets.

24. The assembly of claim 1 wherein said membrane comprises a thin film membrane.

25. The assembly of claim 1 wherein said membrane filter means comprises an ultrafiltration membrane operable at a pH from about 2 to about 11, a temperature of below about 120° Fahrenheit and a pressure of from about 40 to about 200 psi.

26. The assembly of claim 1 wherein said membrane filter means comprises a spiral wound ultrafiltration membrane cartridge having a gross contact area of from about 6 to about 18 ft$^2$.

27. The assembly of claim 1 comprising means for dissipating heat, from said assembly.

28. The assembly of claim 27 wherein said means for dissipating heat comprises heat exchange fins arranged on said pump means.

29. The assembly of claim 27 wherein said means for dissipating heat comprises a fan arranged to direct air through said assembly.

30. The assembly of claim 1 wherein said means for transporting said liquid from said membrane filter means to said reservoir source comprises means for restricting the flow of treated liquid from said membrane filter means.

31. The assembly of claim 30 wherein said means for restricting liquid flow comprises an orifice means, 32. The assembly of claim 31 wherein the size of the opening of said orifice means is variable.

33. The assembly of claim 1 wherein said eductor means comprises an orifice means for restricting flow of liquid from said membrane filter means.

34. The assembly of claim 33 wherein the size of the opening of said orifice means is variable.

35. A portable ultrafiltration assembly for separating water from an influent liquid feed stream containing greater than about 50 percent by weight water, comprising: centrifugal pump means having an inlet and an outlet; eductor means having an inlet, an outlet and a suction inlet; means for transporting influent liquid feed from a reservoir source to said suction inlet of said eductor means; means for transporting liquid feed from said outlet of said eductor means to said inlet of said centrifugal pump means; membrane filter means comprising a liquid feed treatment zone, a liquid feed inlet, a treated liquid outlet and having a hydrophilic ultra-filtration membrane through which water can pass from said liquid feed treatment zone to a water receiving zone; means for transporting liquid feed from said outlet of said centrifugal pump means to said liquid feed inlet of said membrane filter means; means for transporting treated liquid from said treated liquid outlet of said membrane filter means to said inlet of said eductor means; means for transporting treated liquid from said membrane filter means to said reservoir source; temperature and pressure sensing means, sufficient to detect temperature and pressure variations of said liquid feed in said assembly; means cooperating with said temperature sensing means to interdict the operation of said pump means; means cooperating with said pressure sensing means to interdict the operation of the pump means; wherein said means for transporting said treated liquid to said reservoir source cooperates with said centrifugal pump means to maintain a liquid feed pressure of from about 45 to about 100 lbs/in$^2$ at said membrane.

* * * * *